United States Patent
Holla et al.

(10) Patent No.: US 12,381,831 B2
(45) Date of Patent: Aug. 5, 2025

(54) DYNAMIC PROVISIONING OF MULTIPLE RSS ENGINES

(71) Applicant: VMware LLC, Palo Alto, CA (US)

(72) Inventors: Aditya G. Holla, Palo Alto, CA (US); Rajeev Nair, Palo Alto, CA (US); Shilpi Agarwal, Palo Alto, CA (US); Subbarao Narahari, Palo Alto, CA (US); Zongyun Lai, Beijing (CN); Wenyi Jiang, Palo Alto, CA (US); Srikar Tati, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 173 days.

(21) Appl. No.: 16/867,855

(22) Filed: May 6, 2020

(65) Prior Publication Data

US 2020/0274820 A1    Aug. 27, 2020

Related U.S. Application Data

(63) Continuation of application No. 15/963,504, filed on Apr. 26, 2018, now Pat. No. 10,735,341.

(51) Int. Cl.
*H04L 47/62* (2022.01)
*H04L 43/0894* (2022.01)
(Continued)

(52) U.S. Cl.
CPC ...... *H04L 47/6255* (2013.01); *H04L 43/0894* (2013.01); *H04L 45/023* (2013.01); *H04L 45/7453* (2013.01)

(58) Field of Classification Search
CPC .............. H04L 47/6255; H04L 45/023; H04L 43/0894; H04L 45/7453
See application file for complete search history.

(56) References Cited

U.S. PATENT DOCUMENTS 7,701,849 B1 *   4/2010   Ma .......................... H04L 47/10
                                                          370/235
7,936,770 B1     5/2011   Frattura et al.
(Continued)

OTHER PUBLICATIONS

Author Unknown, "NSX-T Networking Best Practices," NSX-T 1.1, Month Unknown 2017, 21 pages, VMware, Inc., Palo Alto, CA, U.S.A.

(Continued)

*Primary Examiner* — Steven Hieu D Nguyen
(74) *Attorney, Agent, or Firm* — Quarles & Brady LLP

(57) ABSTRACT

An approach for a dynamic provisioning of multiple RSS engines is provided. In an embodiment, a method comprises monitoring a CPU usage of hardware queues implemented in a plurality of RSS pools, and determining whether a CPU usage of any hardware queue, implemented in a particular RSS pool of the plurality of RSS pools, has increased above a threshold value. In response to determining that a CPU usage of a particular hardware queue, implemented in the particular RSS pool, has increased above the threshold value, it is determined whether the particular RSS pool includes an unused hardware queue (a queue with light CPU usage). If such an unused hardware queue is presented, then an indirection table that is associated with the particular RSS pool is modified to remap one or more data flows from the particular hardware queue to the unused hardware queue.

12 Claims, 6 Drawing Sheets

(51) Int. Cl.
  *H04L 45/023* (2022.01)
  *H04L 45/7453* (2022.01)
  *H04L 47/625* (2022.01)

(56) References Cited

U.S. PATENT DOCUMENTS

| | | | |
|---|---|---|---|
| 8,503,468 | B2 | 8/2013 | Akyol et al. |
| 8,848,728 | B1 | 9/2014 | Revah et al. |
| 10,686,716 | B2 | 6/2020 | Holla et al. |
| 10,735,341 | B2 | 8/2020 | Holla et al. |
| 11,025,546 | B2 | 6/2021 | Holla et al. |
| 2009/0238072 | A1 | 9/2009 | Tripathi et al. |
| 2010/0064286 | A1 | 3/2010 | Pinter et al. |
| 2010/0322265 | A1* | 12/2010 | Gopinath ............. H04L 49/901 370/417 |
| 2011/0142064 | A1* | 6/2011 | Dubal ................. H04L 47/125 370/412 |
| 2011/0153935 | A1 | 6/2011 | Li |
| 2013/0117429 | A1* | 5/2013 | Koponen .............. H04L 41/00 709/223 |
| 2013/0343399 | A1 | 12/2013 | Kandula et al. |
| 2014/0059111 | A1 | 2/2014 | Veeraiyan |
| 2014/0122634 | A1 | 5/2014 | Conner et al. |
| 2014/0254594 | A1 | 9/2014 | Gasparakis et al. |
| 2015/0055456 | A1* | 2/2015 | Agarwal ............ H04L 47/6295 370/230 |
| 2015/0055457 | A1* | 2/2015 | Agarwal ............... H04L 49/30 370/230 |
| 2015/0055468 | A1* | 2/2015 | Agarwal ............ H04L 47/2475 370/232 |
| 2015/0100770 | A1* | 4/2015 | Manchineni ........ G06F 9/4401 713/100 |
| 2015/0261556 | A1 | 9/2015 | Jain et al. |
| 2015/0263974 | A1 | 9/2015 | Jain et al. |
| 2015/0381514 | A1 | 12/2015 | Word |
| 2016/0092258 | A1 | 3/2016 | Mehta et al. |
| 2017/0005931 | A1 | 1/2017 | Mehta et al. |
| 2017/0163598 | A1 | 6/2017 | Shen et al. |
| 2017/0187640 | A1 | 6/2017 | Vasudevan et al. |
| 2017/0353391 | A1 | 12/2017 | Piecuch |
| 2018/0157514 | A1 | 6/2018 | Malloy et al. |
| 2018/0157515 | A1 | 6/2018 | Malloy et al. |
| 2018/0159771 | A1 | 6/2018 | Malloy et al. |
| 2018/0285151 | A1 | 10/2018 | Wang et al. |
| 2019/0028435 | A1 | 1/2019 | Khare et al. |
| 2019/0036894 | A1 | 1/2019 | Wang et al. |
| 2019/0173841 | A1 | 6/2019 | Wang et al. |
| 2019/0281018 | A1 | 9/2019 | Zhu et al. |
| 2019/0334829 | A1 | 10/2019 | Holla et al. |
| 2020/0028792 | A1 | 1/2020 | Holla et al. |
| 2020/0036636 | A1 | 1/2020 | Holla et al. |
| 2020/0036646 | A1 | 1/2020 | Mathew et al. |
| 2020/0304418 | A1 | 9/2020 | Holla et al. |
| 2021/0258257 | A1 | 8/2021 | Holla et al. |

OTHER PUBLICATIONS

Author Unknown, "RSS and Multiqueue Support in Linux Driver for VMXNET3," 2020567, Dec. 9, 2015, 3 pages, VMware, Inc.
Author Unknown, "What is Numa?," vSphere 4.1—ESX and vCenter—vSphere Resource Management Guide: Using NUMA Systems with ESX/ESXi, Nov. 29, 2017, 1 page, VMware, Inc.

* cited by examiner

DYNAMIC PROVISIONING OF MULTIPLE RSS ENGINES

This application is a continuation of U.S. application Ser. No. 15/963,504, filed Apr. 26, 2018, entitled "DYNAMIC PROVISIONING OF MULTIPLE RSS ENGINES", the contents of which is incorporated herein by reference in its entirety.

BACKGROUND

A Netqueue feature in a hypervisor provides different algorithms to effectively utilize physical network interface card (NIC)'s receive (Rx) queues. Physical NIC provides Rx queue features such as receive side scaling (RSS), large receive offload (LRO), latency-sensitive, and Netqueue encapsulates these queue capabilities and makes best attempt to distribute Rx-filters of the clients such as virtual NIC and VM kernel NIC on these Rx queues, activating only required number of Rx queues with required queue feature. In turn, physical NIC tries to match incoming packet against applied Rx-filters. Further processing of that packet is done at the central processing unit (CPU) associated with corresponding Rx-queue. Thus, processing is scaled to multiple CPUs. Netqueue algorithms are based on load calculation. They calculate the load of the filters (based on its transmit (Tx), Rx packet rate), and assign them a Rx queue.

Rx queues are of two types. For the first type, a driver exposes a single Rx queue to a networking stack of a hypervisor. The Rx queue is mapped to single hardware Rx queue, and it accepts Rx-filters (such as MAC based filters or combination of outer, inner MAC). If the incoming packets matches any of those applied filters, then further packet processing is done on that Rx queue. Netqueue layer present in a hypervisor could allocate such Rx queues with additional features like LRO and latency sensitive. Another type is where a driver exposes a single Rx queue with Receive Side Scaling (RSS) feature, which is backed by multiple hardware queues. This pool of queues backing up the single Rx queue with a RSS feature is referred to as RSS engine or RSS pool. Netqueue layer in a hypervisor allocates such Rx queue with RSS feature and applies filter on them. If the incoming packets matches any of those applied filters, then one more level of queue-selection is done. This selection process is done by executing RSS hash algorithm supported by the hardware (such as Toeplitz hash function) on selected fields of the packet. Output of this function is a hash-value that is used as selection criterion to decide the hardware queue in the pool to process this packet. Some devices further provide indirection table that is mapped with different queues for different hash values. Hardware will execute the packet with particular hash value on the queue mentioned in the table.

Currently, physical NICs expose a single RSS queue to a pool of hardware queues (number of hardware queues typically ranges from 8-16). Filters belonging to VM kernel NICs (management or infrastructure traffic) are applied to this RSS queue. But, sharing one single RSS pool for all different traffic can cause problems. For example, a live migration traffic (such as vMotion traffic) may be asynchronous, and thus impose momentary queue-resource constraints on other shared workloads such as virtual storage area network (vSAN) or VTEP (virtual extensible LAN tunnel end point) traffics. That may impede the efficiency of handling the data flows and the RSS queues. Also, RSS hash algorithm typically considers 5 tuple fields of the packet. It could be possible that different shared workloads could have same RSS hash value for their flows and end up sharing same hardware queue. In another example, some traffics such as live migration require high throughput, thus needing multiple Rx queues in the RSS pool for a brief period. In contrast, some other infrastructure traffics have deterministic constant load.

SUMMARY

Techniques are described herein for a dynamic provisioning of multiple RSS engines. In an embodiment, the dynamic provisioning provides an isolation between different types of data traffics. The isolation may be implemented by dynamically assigning different traffic flows to separate hardware queues, and dynamically reassigning the traffic flows from some queues to other queues if loads of some flows increase above a threshold.

Data traffics may be assigned, and reassigned, to RSS engines dynamically. The traffics may be assigned/reassigned to the engines even if some traffics requested assignments of the engines in advance. Assigning a data flow to an RSS engine includes assigning the data flow packets to a logical queue that is associated with the RSS engine. Upon receiving a request for assigning a particular RSS engine to a particular data flow, a netqueue layer may create a mapping entry in a mapping table implemented in a PNIC. A mapping table is used to store mappings from Rx filters of data flows to logical queues. A mapping entry may specify for example, a mapping from a particular Rx filter that is specific to a particular data flow onto an identifier of a particular logical queue that is associated with a particular RSS pool. However, if loads computed for some data flows have exceeded a particular threshold, then the mapping table and the corresponding assignments may be dynamically modified to rebalance the loads.

Data traffics may be dynamically assigned, and reassigned, to RSS engines if certain conditions are met. A first condition is based on a load-based-test. The test includes determining whether a load computed for an Rx filter corresponding to a data flow has reached a threshold value. The load may be computed as a ratio of a packet receiving rate to a packet transmitting rate for the flow. If the ratio has reached a certain threshold value, then a netqueue layer tests a second condition. The second condition is based on a test for determining whether an empty slot is available in a mapping table. If an empty slot is available, then the netqueue layer causes creating, in the mapping table, a mapping entry for mapping a destination MAC address included in the data flow packet onto an identifier of a particular logical queue. However, if the ratio has not reached the threshold, or no empty slot is available in the mapping table, then the data packets of the flow are queued into available hardware queues until the ratio reaches the threshold and an empty slot becomes available in the mapping table.

Data traffic may be dynamically assigned, and reassigned, to multiple hardware queues of multiple RSS engines. Assigning a data flow to a particular RSS engine includes assigning the data flow packets to a particular logical queue, and then to a hardware queue associated with the logical queue. Each logical queue has an associated indirection table that is indexed using hash values. An indirection table maps hash values computed for data flow packets onto identifiers of hardware queues in an RSS pool. The indirection tables may be pre-populated in advance using hash values computed based on for example, training data flows. Each traffic flow assigned to a logical queue is guaranteed an entry in an indirection table.

As traffic flows are received by PNICs, a netqueue layer monitors a netpoll CPU usage for the traffic flows. The netqueue feature may for example, perform a CPU load calculation. The load calculation may include computing load values for Rx filters. The load values may be computed for each Rx filter individually. For a given Rx filter, a load may be computed as for example, a ratio of a packet receiving rate to a packet transmitting rate.

If a netpoll CPU usage of a particular Rx filter assigned to a particular logical queue associated with a particular RSS pool increases above a threshold value, then a netqueue layer searches, in the particular RSS pool, for an unused hardware queue (which may be a queue with a light netpoll CPU usage). If such a hardware queue is found, then an indirection table associated with the particular logical queue is modified to remap some of the flows from the loaded hardware queues to the unused hardware queue in the pool. This allows rebalancing of the data traffics and the hardware queues.

However, if the particular RSS pool includes no hardware queue that is unused or has a light CPU usage, then the netqueue layer searches for another pool with hardware queues that have a light CPU usage. If such a pool is found, then that pool and the particular pool are resized with different counts of hardware queues, and the corresponding indirection tables are modified to capture the reassignment between the hash values and the identifiers of RSS hardware queues.

If several hardware queues in an RSS pool have a light CPU usage, then the netqueue layer may cause resizing of the pool with a smaller count of hardware queues, and free up some unused queues. The free queues may be assigned to other pools to help rebalancing the loads of the traffic flows. Once the pools are resized and once some hardware queues are reassigned from some pools to other pools, the corresponding indirection tables are modified to reflect the reassignments.

The netpoll processes associated with hardware queues in RSS pools can be affinized to a CPU or a non-uniform memory access (NUMA) node on which application processes, such as a vMotion process, are executed. A netqueue layer can place for example, a plurality of RSS pools in a NUMA node where all the filters are present. That may be implemented when the plurality of RSS pools is available to avoid migrating all filters of a single RSS pool to one single NUMA node.

DETAILED DESCRIPTION

Figure 1:
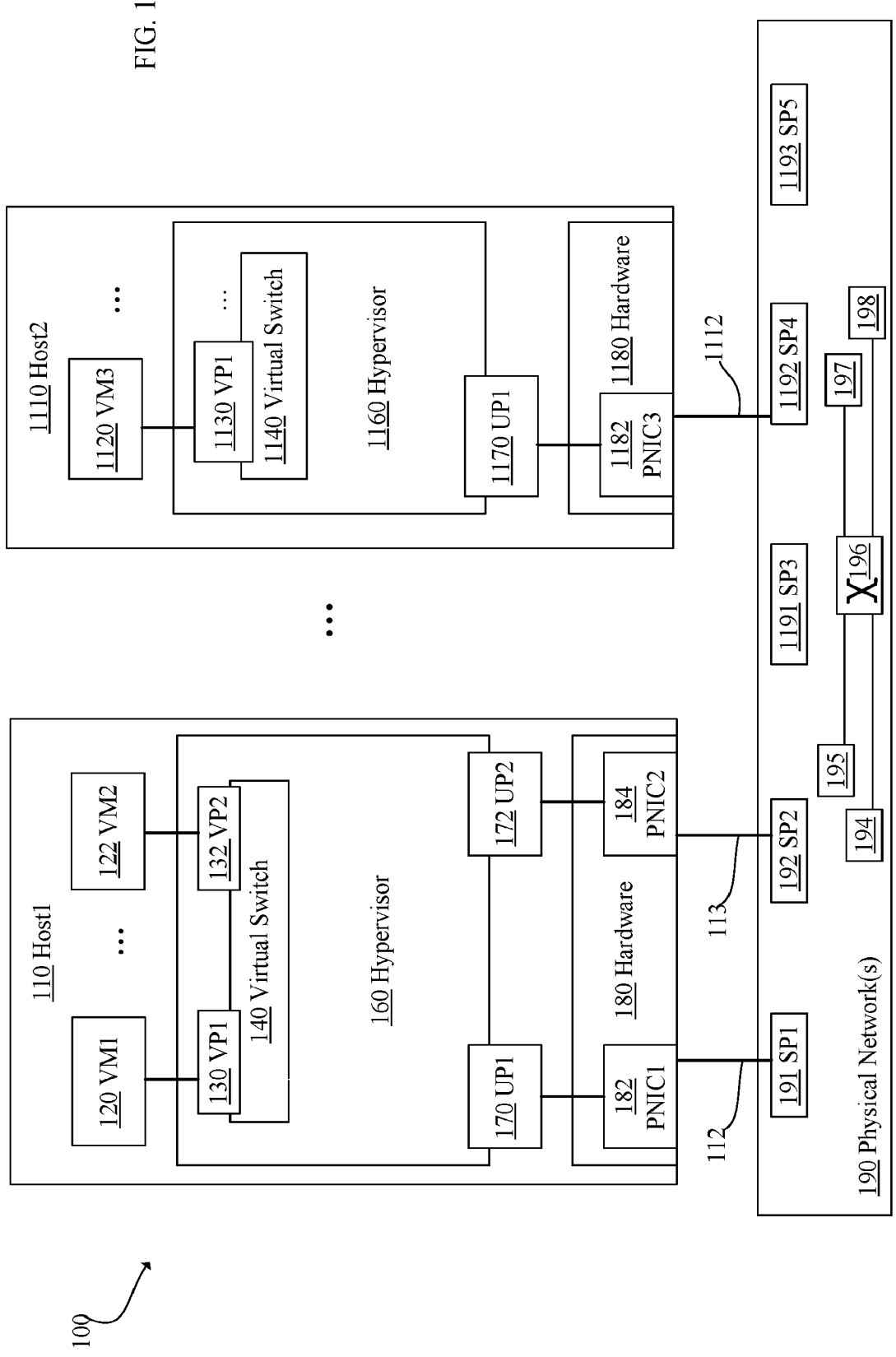
FIG. 1 is a block diagram depicting an example system architecture for a dynamic provisioning of multiple RSS engines.

In the following description, for the purposes of explanation, numerous specific details are set forth in order to provide a thorough understanding of the presently described method. It will be apparent, however, that the present approach may be practiced without these specific details. In other instances, well-known structures and devices are shown in a block diagram form to avoid unnecessarily obscuring the present approach.

Certain embodiments as described here relate to a method to dynamically allocate multiple RSS pools for different infrastructure traffic based on its load. This approach will help to isolate different management, infrastructure traffics thus prevents denial of service, and provide better quality of service.

In one embodiment, a method is performed by a netqueue layer in a hypervisor to dynamically create multiple RSS pools based on demand.
  (a) Infrastructure traffics (such as VTEP or vSAN), or VM could request for RSS pool upfront for its filter. And, Netqueue layer creates RSS queue and apply those filters.
  (b) Infrastructure traffics, or VM could reserve an exclusive RSS pool. Netqueue layer will create RSS queue and apply filter on it.
  (c) For infrastructure traffics which have not reserved RSS Rx queue upfront (such as vMotion), netqueue layer can allocate RSS Rx queue for them dynamically when corresponding Rx-filter load increases.
  (d) Infrastructure traffics, or VM can also share same RSS pool for its filters.
  (e) Once the RSS Rx queue is allocated, netqueue layer monitors netpoll CPU usage of each of constituting hardware queues in the pool.
  (f) If the netpoll CPU usage of any hardware queue increases above the threshold then,
  (f-1) search for an unused hardware queue in the same pool (a queue with light netpoll CPU usage), then change the indirection table to remap some of the flows from loaded queue to this unused queue.
  (f-2) if in this pool, all the hardware queues are used and have high CPU usage, then search for a pool with queues having light CPU usage and resize both the pools with a different number of hardware queues.
  (g) If several hardware queues have light CPU usage in a pool, then resize this pool with less number of hardware queues, so that free queues are used by other loaded pools.
  (h) Each netpoll process associated with hardware queue in a given pool, can be affinitized to a CPU or NUMA node where application process (such as vMotion process) is running.

By following above mentioned process, isolation is provided to different infrastructure traffics, VMs, so that each is guaranteed with minimum number of hardware queues and its own indirection table in the RSS pool. Presence of multiple pools (in contrast with a single RSS pool with many (or, all) hardware queues) with relatively small number of hardware queues, allows ESX stack implement NUMA-aware placement of filters.

As mentioned in process (h) above, Netqueue layer could place one RSS pool in a NUMA node where all its filters are present; this would be difficult to implement in case of single RSS pool as we have to migrate all the filters using this single pool to one single NUMA node.

In one embodiment, this approach needs support from the physical NIC driver which can expose multiple RSS pools and dynamic resizing of them.

Example System Architecture for a Dynamic Provisioning of Multiple RSS Engines

FIG. 1 is a block diagram depicting an example system architecture 100 for a dynamic provisioning of multiple RSS engines. In the depicted example, example system architecture 100 includes two or more hosts 110, 1110, and one or more physical networks 190.

Host 110 may include a hypervisor 160, hardware components 180, and other components not depicted in FIG. 1. Host 110 includes a virtualization layer that abstracts processor, memory, storage, and networking resources of hardware 180 of the host machine 110 into one or more virtual machines ("VMs") 120 . . . 122 that run concurrently on host 110. VMs 120-122 run on top of the virtualization layer, referred to herein as a hypervisor 160, which enables sharing of the hardware resources by VMs 120-122. Hypervisor 160 may include a virtual switch 140, and may provide connectivity to and from one or more virtual machines. FIG. 1 depicts that host 110 hosts two virtual machines VM 120, VM2 122. However, host 110 may host as many virtual machines as the configuration of the host allows for.

Host 1110 may include a hypervisor 1160, hardware components 1180, and other components not depicted in FIG. 1. Hypervisor 1160 may include a virtual switch 1140, and may provide connectivity to and from one or more virtual machines. FIG. 1 depicts that host 1110 hosts one virtual machine VM 1120. However, host 1110 may host as many virtual machines as the configuration of the host allows for.

Hardware components 180/1180 may include hardware processors, memory units, data storage units, and physical network interfaces, some of which are not depicted in FIG. 1. Hardware components 180/1180 may also include physical network interface controllers, such as PNIC1 182, PNIC 184, PNIC2 1182, that may provide connectivity to routers and switches of physical networks 190. PNICs are described in detail in FIG. 2.

Hypervisors 160, 1160 use uplinks 170, 172, 1170, respectively, to provide connectivity to and from PNICs 182, 184, 1182.

Hypervisor 160/1160 include components that implement an approach for a dynamic provisioning of multiple RSS engines. For example, hypervisor 160/1160 may include components for generating, dynamically updating, and maintaining a mapping table that includes mapping entries for mapping destination MAC addresses of data flow packets onto identifiers of logical queues. The mapping table may be used to direct incoming data packets to corresponding logical queues implemented in system architecture 100. For example, upon receiving a data packet, a destination MAC address may be extracted from the packet, and used as a search key to look up the mapping table to determine an identifier of a logical queue that corresponds to the destination MAC address. Examples of the mapping tables are described in FIGS. 2 and 4.

Hypervisor 160/1160 may include components for generating, dynamically updating, and maintaining one or more indirection tables. An indirection table is a table that includes mappings from hash values onto identifiers of hardware queues implemented in RSS engines. Usually, each RSS engine has its own indirection table. Upon receiving a data packet and determining, based on a mapping table, a logical queue that corresponds to a destination MAC address extracted from the packet, a hash value from contents of selected fields of the packet may be computed. The computed hash value may be used as a search key to look up the indirection table associated with the logical queue to determine an identifier of a hardware queue for queuing the packet. The identifier is used to identify a corresponding hardware queue. Subsequently, the data packet is queued into the corresponding hardware queue. Examples of indirection tables are described in FIG. 3-4.

Virtual switch 140/1140 may be configured to monitor and manage data traffic that is communicated to and from hypervisor 160/1160, respectively. Virtual switch 140/1140 may be implemented as a kernel component of hypervisor 160/1160, respectively, or as an entity that is separate from hypervisor 160/1160, but that communicates with hypervisor 160/1160.

Implementations of virtual switch 140/1140 may vary and may depend on a type of product in which the switch is deployed as a virtualization medium. For example, virtual switch 140/1140 may be implemented as part of hypervisor 160/1160, as it is depicted in FIG. 1, and as it is in the vSphere® and KVM® lines of products. Alternatively, although not depicted in FIG. 1, a virtual switch may be implemented as a hardware component, or as part of a user space, or within a privileged virtual machine. Examples of such implementations include the Hyper-V® and Xen® lines of products.

Virtual machines, including VMs 120/122/1120, may be realized as complete computational environments. The virtual machines contain virtual equivalents of hardware and software components of the physical computing systems. Virtual machines may be instantiated as virtualized computing instances. The instances may be equipped with their own resources, may be assigned their own workloads, and may be configured to perform their own tasks assigned to the workloads. Virtual resources allocated to the virtual machines may include virtual CPUs, virtual memory, virtual disks, virtual network interface controllers and the like. The virtual machines may be configured to execute guest operating systems and guest applications.

A virtualized computing instance may be realized as a hardware virtualization and/or a software virtualization. As a hardware virtualization, the instance may represent for example, an addressable virtual machine. As a software virtualization, the instance may be used to provide for example, an isolated user space instance. Virtualized computing instances may include containers running on a top of host operating systems, virtual private servers, client computers, and hybrid combinations of thereof.

Physical networks 190 may include local area networks and/or wide area networks, and may utilize various hardware and software configurations. For example, physical networks 190 may include one or more routers 194, 195, 197, 198, one or more switches 196, and one or more switch ports 191, 192, 1191, 1192, and 1193. Physical networks 190 may also include other components that are not depicted in FIG. 1.

Example PNICs that Implement RSS Queues

Figure 2:
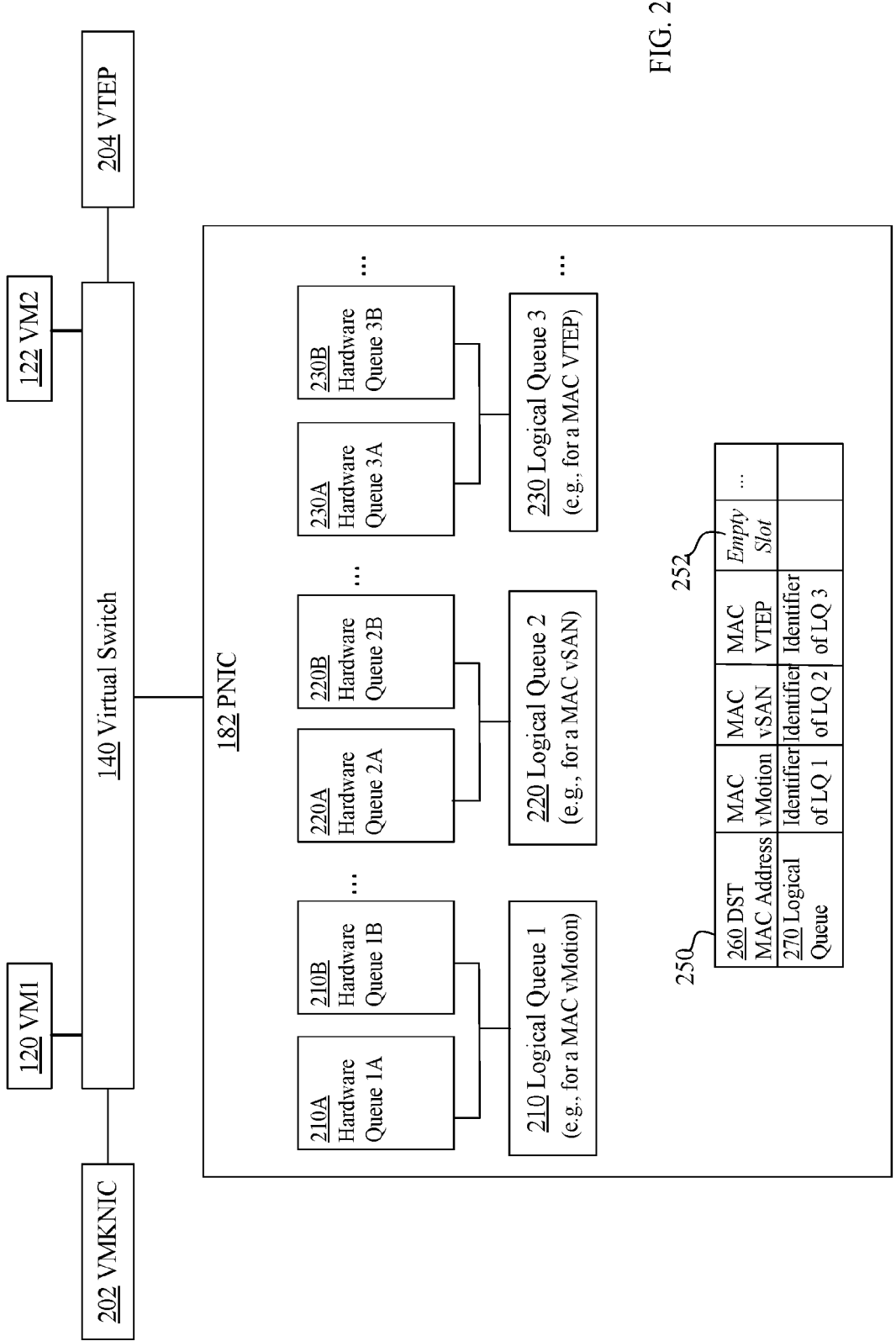
FIG. 2 is a block diagram depicting an example physical network interface card (PNIC) that is configured to implement logical queues and receive side scaling (RSS) engines.

FIG. 2 is a block diagram depicting an example PNIC 182 that is configured to implement logical queues and RSS engines. The logical queues are also referred to as RSS queues. Each logical queue is associated with its own RSS engine, also referred to as an RSS pool. Each RSS pool may have one or more hardware queues.

PNIC 182 may be configured to implement logical queues. In the depicted example, PNIC 182 is configured to implement three logical queues. The depicted logical queues include a logical queue 210, a logical queue 220, and a logical queue 230. However, PNIC 182 may implement as many logical queues as the configuration of PNIC 182 allows for.

An assignment between traffic flows and logical queues may be defined using a mapping table 250. Mapping table 250 may include mappings between destination MAC addresses 260 of incoming data packets and identifiers 260 of the logical queues. For example, mapping table 250 may include a mapping from a MAC address indicating a vMotion flow as a destination to an identifier of a logical queue 1, a mapping from a MAC address indicating a vSAN flow as a destination to an identifier of a logical queue 2, and a mapping from a MAC address indicating a VTEP flow as a destination to an identifier of a logical queue 2. Mapping table 250 may also include other mappings and one or more empty slots 252.

Continuing with the above example of mapping table 250, the data packets that include a MAC address of the vMotion flow, which is destined to a virtual kernel network interface card (vmknic) 202, may be mapped onto logical queue 210. The data packets that include a MAC address of the vSAN flow, which is destined to vmknic 202, may be mapped onto logical queue 220. The data packets that include a MAC address of a VTEP flow, which is destined to a VTEP 204 and subsequently to VM1 120 and/or VM2 122, may be mapped onto logical queue 230. Other mapping entries may also be included in mapping table 250.

A logical queue may be associated with its own RSS pool of hardware queues. Typically, a logical queue is associated with an RSS pool of 8 to 16 hardware queues. Merely to illustrate clear examples, FIG. 2 depicts that each of the logical queues 210, 220, 230 includes two dedicated hardware queues. However, the logical queues may be configured with as many hardware queues as the configuration of PNIC 182 allows for.

In the depicted example, logical queue 210 is associated with a pool of two hardware queues, including a hardware queue 210A and a hardware queue 210B. Logical queue 220 is associated with a pool of two hardware queues, including a hardware queue 220A and a hardware queue 220B. Logical queue 230 is associated with a pool of two hardware queues, including a hardware queue 230A and a hardware queue 230B.

The described example configuration of PNIC 182 should not be viewed as limiting in any way because additional logical queues, additional hardware pools and additional hardware queues may also be implemented in PNIC 182.

Queuing Data Packets into Hardware Queues of RSS Engines

Figure 3:
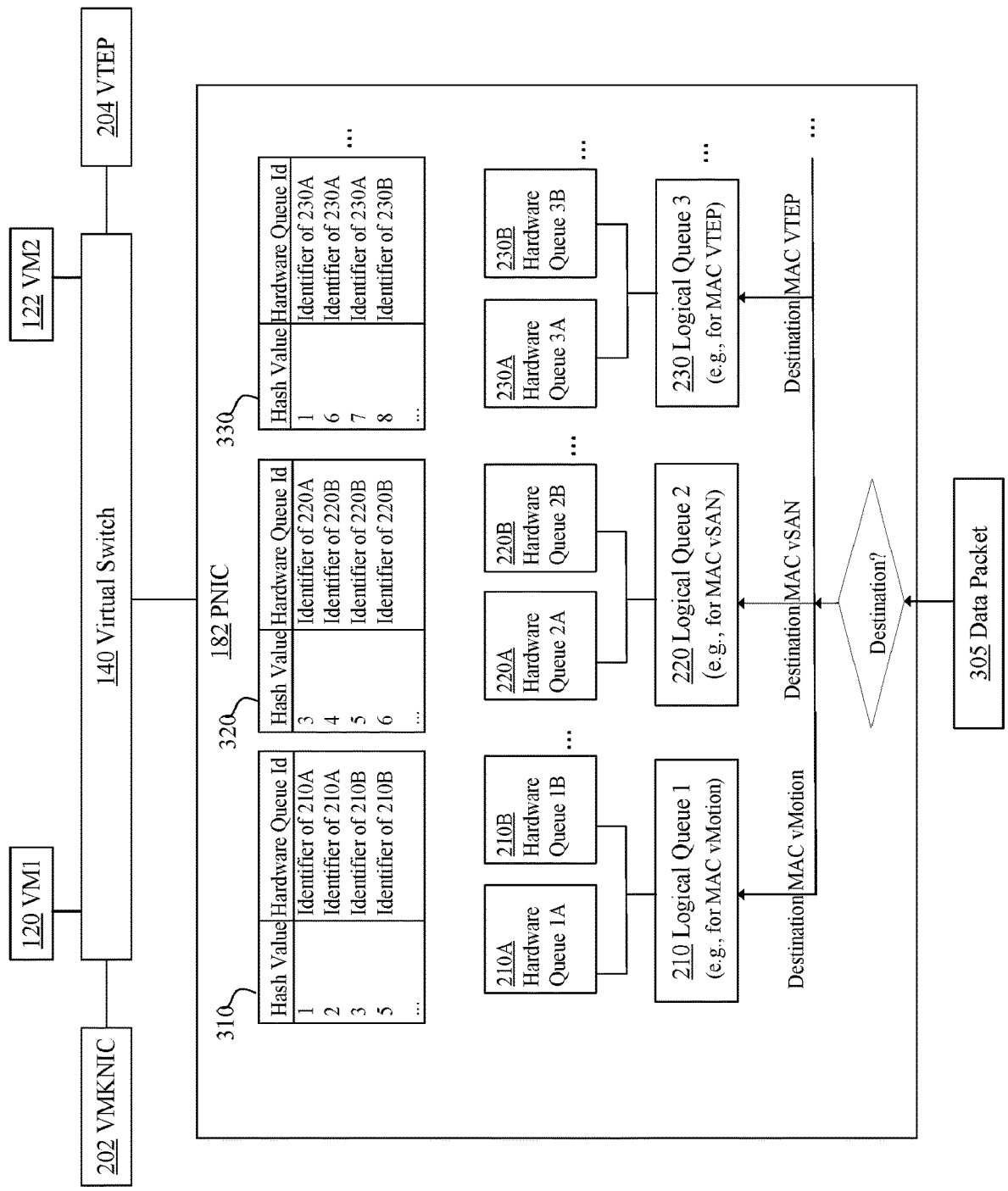
FIG. 3 depicts an example approach for queueing data packets into hardware queues of RSS engines.

FIG. 3 depicts an example approach for queueing data packets into hardware queues of RSS engines. In the depicted example, PNIC 182 is configured with three logical queues described in detail in FIG. 2. However, the configuration of PNIC 182 is not limited to three logical queues.

Each of the logical queues 210, 220, 230, is associated with its own RSS engine. Specifically, logical queue 210 is associated with an RS S engine that includes two or more hardware queues 210A, 210B; logical queue 220 is associated with an RSS engine that includes two or more hardware queues 220A, 220B; and logical queue 230 is associated with an RSS engine that includes two or more hardware queues 230A, 230B. The logical queues, however, may be configured with as many hardware queues as the configuration of PNIC 182 allows for.

Each logical queue is associated with its own indirection table. In the depicted example, logical queue 210 is associated with an indirection table 310, logical queue 220 is associated with an indirection table 320, and logical queue 230 is associated with an indirection table 330. Indirection table 310 includes mappings from various hash values onto hardware queues 210A and 210B. Indirection table 320 includes mappings from various hash values onto hardware queues 220A and 220B. Indirection table 330 includes mappings from various hash values onto hardware queues 230A and 230B. Other types of mappings may also be implemented.

Upon receiving a data packet 305, data packet 305 is partially parsed to determine at least a destination MAC address included in the packet. Data packet 305 will typically include an unencrypted portion and an encrypted portion. The partial parsing of data packet 305 pertains to parsing the unencrypted portion of the packet, and the destination MAC address is extracted from the unencrypted portion of packet 305.

The extracted destination MAC address is used to determine a logical queue for queuing data packet 305. The determined logical queue may be any queue from logical queues 210, 220, 230, and others.

Once packet 305 is assigned to a logical queue, a hash value is computed from contents of selected fields of packet 305. The computed hash value is used to perform a lookup in an indirection table associated with the determined logical queue. For example, if the determined logical queue is logical queue 230 and the computed hash value is six, then indirection table 330 is used, and an identifier of hardware queue 230A is retrieved from indirection table 330. Subsequently, the data packet is queued into hardware queue 230A.

Example Reasons for a Dynamic Provisioning of RSS Engines

The example described in this section is provided to illustrate some of the reasons for a dynamic provisioning of RSS engines. As explained below, even if a mapping table and indirection tables are initially designed to balance a distribution of incoming data packets into hardware queues, the initial distribution of the packets into queues may quickly become unbalanced. This may occur when for example, a large count of data packets of one type is received in a short period of time. Therefore, unless the assignment of hardware queues to data flows can be dynamically modified, some of the hardware queues may quickly become fully loaded, while other hardware queues may carry very light loads.

Figure 4:
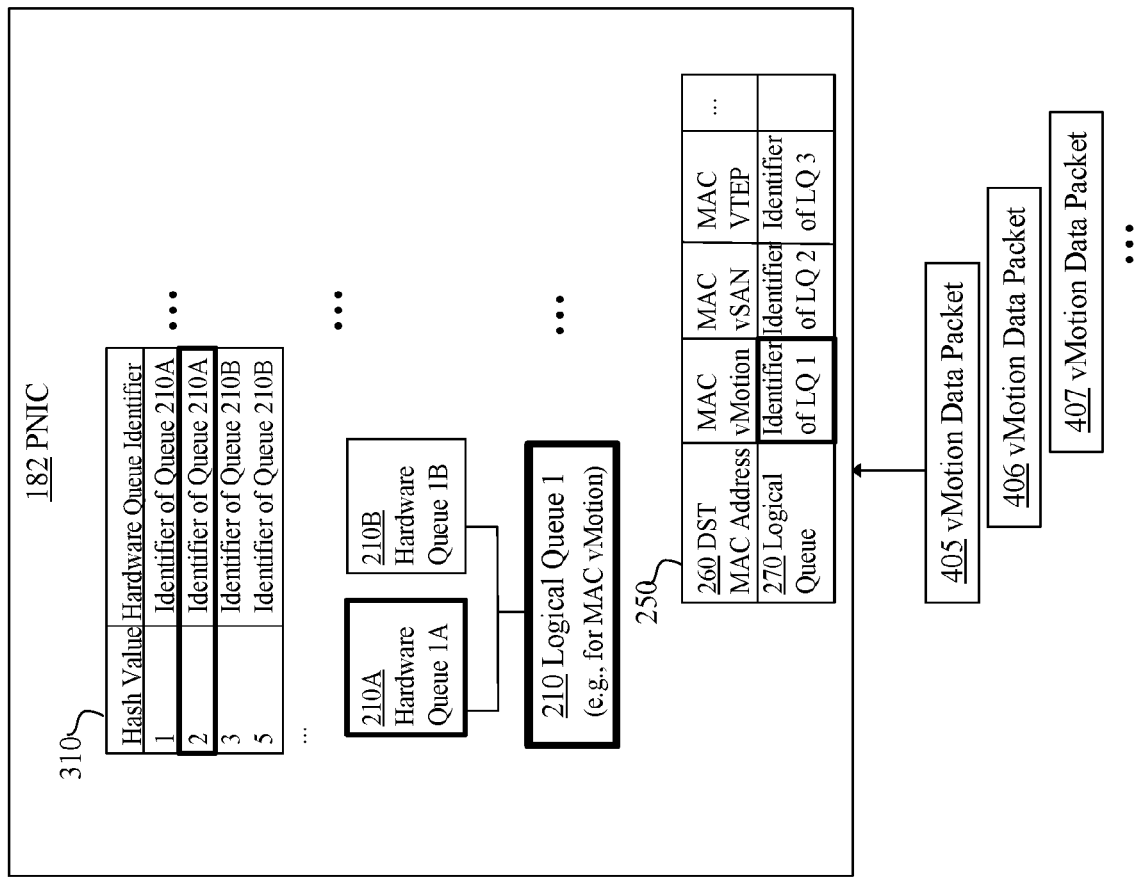
FIG. 4 depicts an example approach for queueing data packets into hardware queues of RSS engines.

FIG. 4 depicts an example approach for queueing data packets into hardware queues of RSS engines. In the depicted example, a sequence of a vMotion data packets is provided to PNIC 182. The sequence may include a vMotion data packet 405, a vMotion data packet 406, a vMotion data packet 407, and so forth.

Upon receiving vMotion data packet 405, an unencrypted portion of packet 405 is parsed to determine a destination MAC address included in the packet in clear. In the depicted example, a destination MAC address extracted from packet 405 is a MAC address of a vMotion flow. In fact, in this example, each of packets 405, 406 and 407 carries the MAC address of the vMotion data flow.

The extracted MAC address may be used as a key to look up mapping table 250 to determine an identifier of a logical queue for queueing data packet 405. In the depicted example, the mapping table includes a mapping entry that maps the destination MAC address of the vMotion data flow onto an identifier of a logical queue 1, which in FIG. 4 corresponds to a logical queue 210.

Once data packet 405 is assigned to logical queue 210, a hash value is computed from contents of selected fields of packet 405. The selected fields usually include the fields that are unencrypted in packet 405. Typically, five fields are selected, and the content of the selected fields is referred to as a 5-tuple. A hash value may be computed using any type of hashing function, including a Toeplitz hashing function, or similar.

The hash value computed for packet 405 is used as a key to look up an indirection table associated with the selected logical queue. In the depicted example, the selected logical queue is logical queue 210. Therefore, the corresponding indirection table is indirection table 310. Suppose that the hash value computed for packet 405 is two. For the hash value of "two," indirection table 310 table includes a mapping from the hash value of "two" onto an identifier of a hardware queue 210A. Therefore, in this example, data packet 405 will be queued to hardware queue 210A. Subsequently, data packet 405 will be provided from hardware queue 210A to a corresponding vmknic, and will be treated as part of the vMotion flow.

The following data packets, such as data packets 406, 407, and so forth, are also part of the vMotion flow. Therefore, they will also be assigned to logical queue 210, and then to hardware queue 210A.

Assuming that in addition to data packets 405-407, a large count of other vMotion packets is received at PNIC 182, and very few non-vMotion packets are received, hardware queue 210A may very quickly become overloaded, while other hardware queues may remain almost empty. Even if the mapping table and the indirection tables are initially defined to optimize and balance the loads of the data flows, it is quite possible that some of the hardware queues may become almost empty. The solution to that problem includes a dynamic provisioning of the RSS engines, and is described in detail in FIG. 5-6.

Dynamic Updating of a Mapping Table

Figure 5:
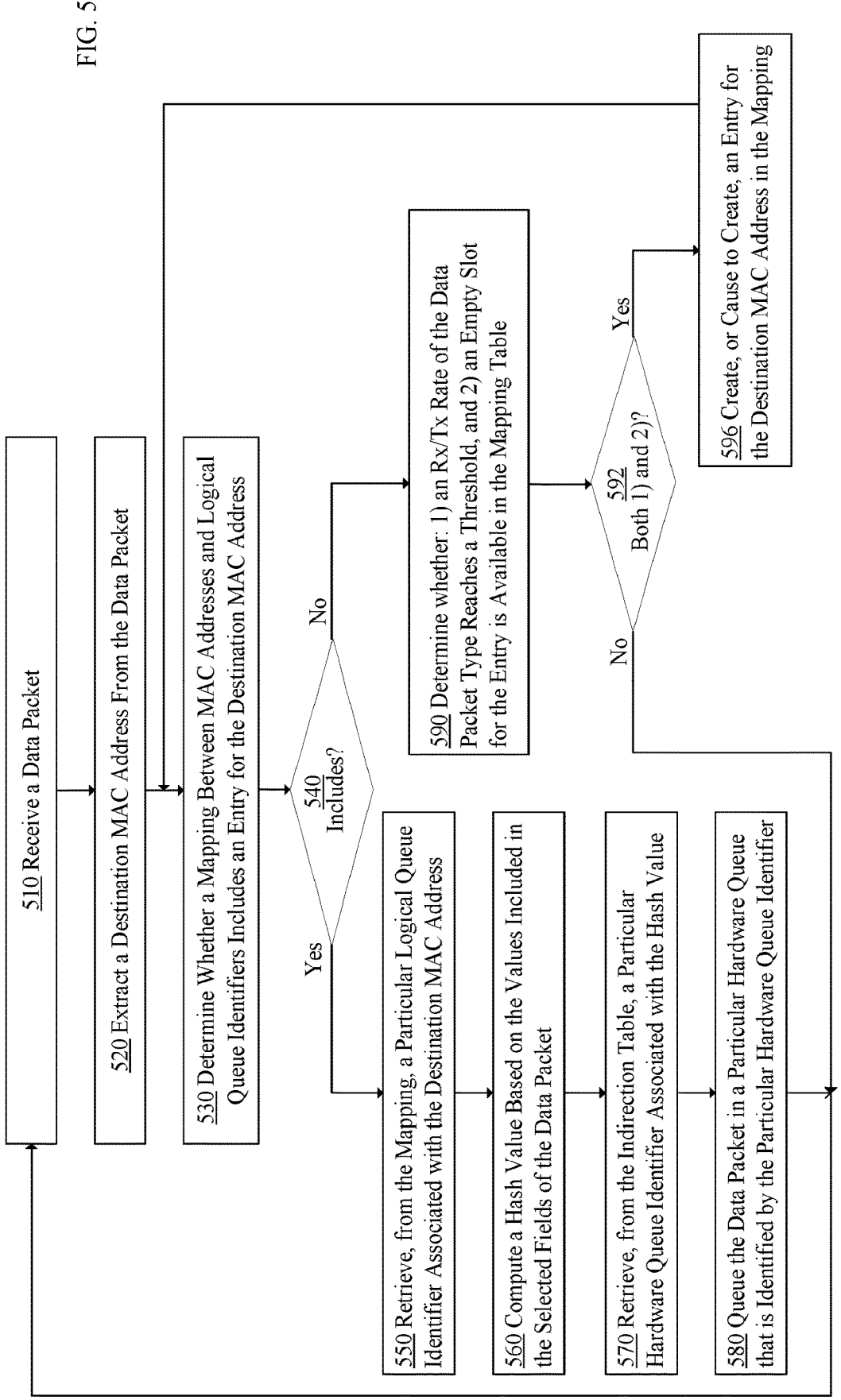
FIG. 5 depicts an example flow chart for dynamically updating a mapping table.

FIG. 5 depicts an example flow chart for dynamically updating a mapping table. In step 510, a data packet is received by a PNIC. The data packet may be part of any data flow, including a vMotion flow, a vSAN flow, a VTEP flow, and the like.

In step 520, an unencrypted portion of the received data packet is parsed to determine a destination MAC address included in the packet. The destination MAC address is extracted from the data packet and is used as a search key in a next step.

In step 530, the destination MAC address extracted from the data packet is used as a search key to look up a mapping table to determine whether a mapping entry for the destination MAC address is included in the table. The mapping table may include one or more mapping entries that define a correspondence between destination MAC addresses and identifiers of logical queues used by the PNIC.

In step 540, a test is performed to determine whether the mapping table includes a mapping entry for the destination MAC address extracted from the data packet. If the mapping table includes such a mapping entry, then step 550 is performed. Otherwise, step 590 is performed.

Step 590 is performed when it is determined that the mapping table does not include a mapping entry for the destination MAC address extracted from the data packet. In step 590, two tests are performed to determine whether a mapping entry for the destination MAC address may be added to the mapping table. Both tests need to be satisfied before a new mapping entry may be added to the mapping table.

A first test includes determining a ratio between a packet receiving rate in an Rx queue and a packet transmitting rate in a corresponding Tx queue. It is also determined whether the computed ratio has reached a threshold value. The threshold value may be determined ad hoc or empirically based on for example, training data. If the ratio has not reached the threshold value, then a corresponding hardware queue does not seem to carry a heavy load. Therefore, there is no need to direct the data packets having the particular destination MAC address to RSS engines.

A second test includes determining whether an empty slot is available in the mapping table. This test is as important as the first test because even if the ratio computed in the first test has reached the threshold value, a new entry still cannot be added to the mapping table if no empty slot is available in the mapping table. Having an empty slot available in the mapping table is as important as having the receiving-to-transmitting ratio reaching the threshold value before a new entry can be added to the mapping table.

In step 592, the results of the first and the second tests are analyzed to determine whether both tests have been satisfied. Specifically, if a ratio of the receiving rate to the transmitting rate reaches the threshold value and an empty slot is available in the mapping table, then step 596 is performed. Otherwise, no entry is added to the mapping table at this time, and therefore, step 510 is performed, in which another data packet is awaited and received.

In step 596, an entry for the destination MAC address extracted from the data packet is created. The entry may be created automatically either by invoking functionalities of a hypervisor or invoking functionalities of a PNIC.

A new entry may be created in a mapping table in many ways, and the ways largely depend on the organization of the mapping table. Assuming that the mapping table is organized as mapping table 250 depicted in FIG. 2, a new entry may be created in mapping table 250 by accessing an empty slot 252 in mapping table 250, and storing the destination MAC address in a first field of empty slot 252 in mapping table.

Then, a logical queue to be associated with the destination MAC address is determined. The logical queue may be selected from a plurality of available logical queues by selecting for example, a logical queue that has the lightest CPU load. Other ways of selecting the logical queue may also be implemented.

Once a logical queue is selected, an identifier for the selected logical queue is determined and stored in a second field of empty slot 252. At this point, slot 252 includes the mapping entry that maps the destination MAC address extracted from the data packet onto the identifier of the selected logical queue. Subsequently, step 530 is performed.

However, if the mapping table already includes a mapping entry that maps the destination MAC address extracted from the data packet onto an identifier of a particular logical queue, then step 550 is performed.

In step 550, the mapping entry that maps the destination MAC address and the identifier of the particular logical queue is accessed, and the identifier of the particular logical queue is extracted from the entry. The identifier is used to identify the particular logical queue. Once the particular logical queue is identified, the data packet is associated with the particular logical queue.

In step 560, a hash value is computed for the data packet. The hash value may be computed in many different ways. One way is to select certain fields in the unencrypted portion of the data packet, and use the contents of the selected fields to compute the hash value.

In step 570, the computed hash value is used to look up an indirection table associated with the particular logical queue. Since the indirection tables are pre-populated in advance for the hash values for the traffic flows, the indirection table will most likely include an entry for the hash value computed for the data packet. Based on the hash value, an identifier of a particular hardware queue is retrieved from the indirection table.

In step 580, the retrieved identifier of the particular hardware queue is used to identify the particular hardware queue, and the data packet is stored in the particular hardware queue.

The process is repeated for each received data packet. If the mapping table does not include a mapping entry for a destination MAC address extracted from a received data packet, then a new mapping entry may be added for the destination MAC address, provided that the two tests described above are satisfied. If the two tests are satisfied, then the mapping table may be dynamically updated.

In addition to modifying the mapping table by dynamically adding new entries to the mapping table, some entries, if needed, may be dynamically deleted from the mapping table. Upon deleting a mapping entry from the mapping table, an empty slot, such as slot 252, may become available in the mapping table.

Dynamic modifications to the mapping table allow updating the assignments between the data flows and the logical queues as the data packets are received. This feature allows rebalancing the loads of the data flows, and thus enhances utilization of the RSS engines.

Dynamic Provisioning of Multiple RSS Engines and Hardware Queues

In an embodiment, an approach for a dynamic provisioning of multiple RSS engines allows provisioning of the RSS engines and hardware queues as data packets are received by PNICs. The approach allows to balance the load of the data flows by dynamically modifying the assignments of hardware queues to RSS pools and assignments of the pools to the data flows.

The approach is particularly useful when a large count of data packets of some data traffics is received in a short period of time causing a sudden increase of a CPU load of the data traffics. When a large count of data packets of the same data flow is received, a hardware queue dedicated to that data flow may become very quickly overloaded, while other hardware queues may remain almost empty. By modifying, in a dynamic fashion, the assignment of the hardware queues to logical queues, the loads experienced by the hardware queues may be rebalanced and even optimized. The approach includes modifying contents of the indirection tables associated with the logical queues to reduce the loads of overloaded queues and increase the loads of underutilized queues.

Figure 6:
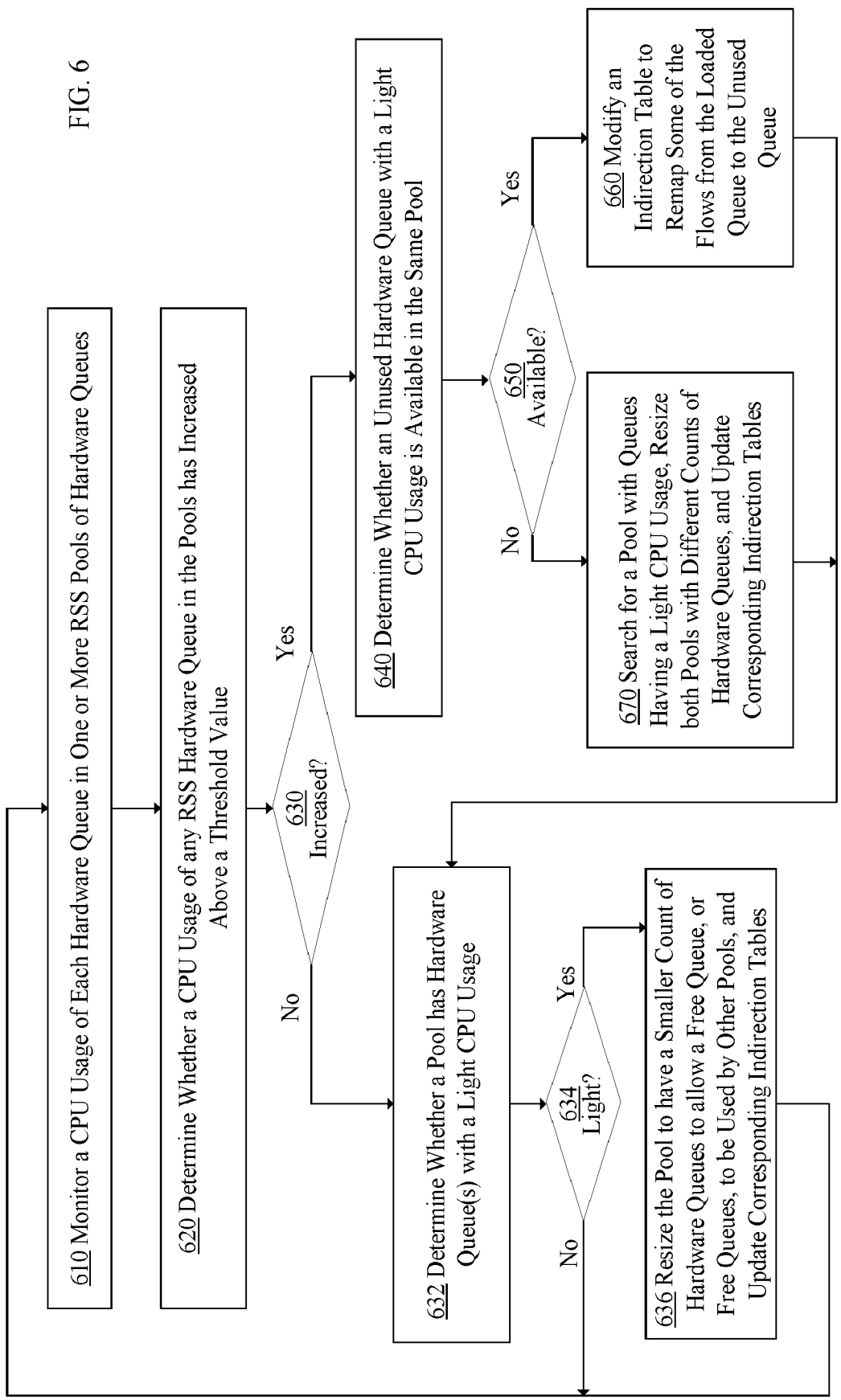
FIG. 6 depicts an example flow chart for a dynamic provisioning of multiple RSS engines.

FIG. 6 depicts an example flow chart for a dynamic provisioning of multiple RSS engines. In step 610, a CPU usage of hardware queues in RSS pools implemented in a PNIC are monitored. The monitoring may include requesting CPU usage information for each hardware queue, comparing the received CPU usage information with certain thresholds or reference data, and determining whether any of the hardware queues is carrying a heavy load and/or whether any of the hardware queues is carrying a light load.

In step 620, it is determined whether a CPU usage of any RSS hardware queue has increased above a threshold value. The threshold value may be determined ad hoc or based on empirical data.

If in step 630, it is determined that a CPU usage of a particular hardware queue in a particular RSS pool has increased above the threshold value, then step 640 is performed. Otherwise, step 632 is performed.

Step 640 is performed if it is determined that there is a particular hardware queue in a particular RSS pool for which a CPU usage has increased above a threshold value. In this step, it is determined whether an unused hardware queue with a light CPU usage is available in the particular RSS pool.

If in step 650 it is determined that the particular RSS pool includes an unused hardware queue with a light CPU usage, then step 660 is performed. Otherwise, step 670 is performed.

In step 660, an indirection table associated with the particular logical queue is modified to reduce the load carried by the particular hardware queue. The indirection table may be modified by for example, remapping some the data flows from the particular hardware queue to other hardware queues that are underutilized and/or experience light loads.

Step 670 is performed if it is determined that no hardware queue with a light CPU usage is available in the particular RSS pool. In this step, a search is performed to determine whether there is another RSS pool that has at least one hardware queue with a light CPU load. If such a hardware queue is found in another RSS pool, then both the particular RSS pool and another RSS pool are resized to reduce the loads of the overloaded hardware queues and to potentially increase the loads of the underutilized queues. Furthermore, the corresponding indirection tables, including the indirection table associated with the particular RSS pool and the indirection table associated with another RSS pool, are modified to account for reassigning of the hardware queues to the particular RSS pool and to another RSS pool.

Step 632 is performed if it is determined that none of the hardware queues in the RSS pools is experiencing an increase of a CPU load above the threshold value. In this step, it is determined whether there is an RSS pool that has at least one hardware queue that has a light CPU usage.

If, in step 634, it is determined that such a hardware queue is present in a certain RSS pool, then step 636 is performed. Otherwise, step 610 is performed, and monitoring of the hardware queues of the RSS engines is continued.

Step 636 is performed when it is determined that a certain RSS pool includes a certain hardware queue that has a light CPU load. In this step, a size of the certain RSS pool is reduced, and some of the hardware queues are released from the certain RSS pool and assigned to other RSS pools. The released hardware queues may be assigned to the RSS pools that for example, experience heavy loads.

Also in this step, the corresponding indirection tables are modified to account for the reduced size of the certain RSS pool and increased size of other pools to which the released hardware queues have been assigned. Then, step 610 is performed, and monitoring of the hardware queues of the RSS engines is continued.

Improvements Provided by the Example Embodiments

The approach presented herein improves the efficiency of PNIC systems and the efficiency of directing data packets to their destinations. It allows to dynamically provision the RSS engines as data packets are received by the PNICs. The approach allows to balance loads of hardware queues of the RSS engines in a dynamic fashion by modifying the assignment of hardware queues to RSS pools and the pools to logical queues as data packets are received.

The approach is particularly useful when a large count of data packets of the same data traffic is received in a short period of time causing a sudden increase of a CPU load of some hardware queues. By modifying, in a dynamic fashion, the assignment of the hardware queues to logical queues as the data packets are received, the loads experienced by the hardware queues may be rebalanced, and the loads of the hardware queues may be equalized to some degree.

By modifying contents of a mapping table, which includes the mappings of data flows onto logical queues, the CPU loads of the data flows may be adjusted and balanced.

By modifying contents of indirection tables, which include the mappings of hash values computed for data packets onto hardware queues, the CPU loads of overloaded queues may be reduced, and the CPU loads of the under-utilized hardware queues may be increased.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

GENERAL CONSIDERATIONS

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. The different combinations constitute various alternative aspects of the embodiments.

What is claimed is:

1. A method for managing a plurality of queues of a network interface card (NIC) of a host computer, the method comprising:
   monitoring a plurality of RSS pools comprising at least first and second RSS pools, each respective RSS pool corresponding to a respective plurality of hardware queues of the NIC;
   assigning flows to the hardware queues of the first and second RSS pools by (i) mapping each flow to one of a first table and a second table respectively associated with the first and second RSS pools, (ii) computing a hash from each flow's set of one or more header values, and (iii) mapping each flow's computed hash value to a record, in the table mapped to the flow, that identifies a hardware queue of the table's associated first or second pool;

determining an association between the hardware queues and a logical queue using at least a hardware queue identifier that is associated with a hash value, the hash value being computed based on values of selected fields of a data packet;

determining that (i) usage of at least one of the hardware queues corresponding to the first RSS pool has increased above a threshold usage value and (ii) the hardware queues of the second RSS pool are underutilized;

based on the determination of the usage and an underutilization, reallocating at least a particular hardware queue from the second RSS pool to the first RSS pool by modifying an indirection table of the second RSS pool associated with a reassignment of the hardware queues;

creating a record in the first table associated with the first RSS pool that maps a set of hash values to the particular hardware queue; and resizing the first RSS pool and the second RSS pool by adjusting a number of hardware queues based on load metrics.

2. The method of claim 1, wherein removing a record from the second table associated with the second RSS pool that maps a set of hash values to the particular hardware queue.

3. The method of claim 1 when it is determined that usage of at least one of the hardware queues corresponding to the first RSS pool has increased above a threshold usage value, the method further comprises:

identifying a particular hardware queue in the first RSS pool that is currently underutilized; and modifying the table associated with the first RSS pool so that a subset of data packets previously mapped to the hardware queue with usage above the threshold usage value are instead mapped to the particular hardware queue.

4. The method of claim 1, wherein each respective RSS pool is associated with a respective logical queue backed by the respective plurality of hardware queues to which the RSS pool corresponds.

5. The method of claim 1, wherein when the NIC receives a data packet, the NIC (i) determines whether a destination address of the packet maps to one of the RSS pools, and (ii) when the destination address maps to a particular RSS pool, selects one of the hardware queues that correspond to the particular RSS pool.

6. The method of claim 1, wherein the method is performed by virtualization software of a host computer on which a plurality of virtual machines execute.

7. A non-transitory machine readable medium storing a program which when executed by at least one processing unit of a host computer manages a plurality of queues of a network interface card (NIC) of the host computer, the program comprising sets of instructions for:

monitoring a plurality of RSS pools comprising at least first and second RSS pools, each respective RSS pool corresponding to a respective plurality of hardware queues of the NIC;

assigning flows to the hardware queues of the first and second RSS pools by (i) mapping each flow to one of a first table and a second table respectively associated with the first and second RSS pools, (ii) computing a hash from each flow's set of one or more header values, and (iii) mapping each flow's computed hash value to a record, in the table mapped to the flow, that identifies a hardware queue of the table's associated first or second pool;

determining that (i) usage of at least one of the hardware queues corresponding to the first RSS pool has increased above a threshold usage value and (ii) the hardware queues of the second RSS pool are underutilized;

based on the determination of the usage and an underutilization, reallocating at least a particular hardware queue from the second RSS pool to the first RSS pool by modifying an indirection table of the second RSS pool associated with a reassignment of the hardware queues;

creating a record in the first table associated with the first RSS pool that maps a set of hash values to the particular hardware queue; and resizing the first RSS pool and the second RSS pool by adjusting a number of hardware queues based on load metrics.

8. The non-transitory machine readable medium of claim 7, wherein a record in the second table associated with the second RSS pool that maps a set of hash values to the particular hardware queue is removed.

9. The non-transitory machine readable medium of claim 7, wherein when it is determined that usage of at least one of the hardware queues corresponding to the first RSS pool has increased above a threshold usage value, the program further comprises sets of instructions for:

identifying a particular hardware queue in the first RSS pool that is currently underutilized; and modifying the table associated with the first RSS pool so that a subset of data packets previously mapped to the hardware queue with usage above the threshold usage value are instead mapped to the particular hardware queue.

10. The non-transitory machine readable medium of claim 7, wherein each respective RSS pool is associated with a respective logical queue backed by the respective plurality of hardware queues to which the RSS pool corresponds.

11. The non-transitory machine readable medium of claim 7, wherein when the NIC receives a data packet, the NIC (i) determines whether a destination address of the packet maps to one of the RSS pools, and (ii) when the destination address maps to a particular RSS pool, selects one of the hardware queues that correspond to the particular RSS pool.

12. The non-transitory machine readable medium of claim 7, wherein the program is a NIC queue management program that is part of virtualization software of a host computer on which a plurality of virtual machines execute.

* * * * *